United States Patent
Hochstetler et al.

(10) Patent No.: US 10,760,665 B2
(45) Date of Patent: Sep. 1, 2020

(54) GOVERNOR DRIVE GEAR FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 317 days.

(21) Appl. No.: 15/862,065

(22) Filed: Jan. 4, 2018

(65) Prior Publication Data

US 2019/0203820 A1 Jul. 4, 2019

(51) Int. Cl.
| | |
|---|---|
| F16H 55/08 | (2006.01) |
| F16H 55/17 | (2006.01) |
| H02K 7/00 | (2006.01) |
| F16H 57/02 | (2012.01) |
| F02C 7/36 | (2006.01) |
| H02K 7/18 | (2006.01) |
| F02C 7/32 | (2006.01) |

(52) U.S. Cl.
CPC .............. *F16H 55/08* (2013.01); *F16H 55/17* (2013.01); *F02C 7/32* (2013.01); *F02C 7/36* (2013.01); *F16H 2057/02082* (2013.01); *H02K 7/006* (2013.01); *H02K 7/1823* (2013.01)

(58) Field of Classification Search
CPC .............................. F16H 55/08; F16H 55/0806
See application file for complete search history.

(56) References Cited

U.S. PATENT DOCUMENTS

| | | | | |
|---|---|---|---|---|
| 4,276,785 | A * | 7/1981 | Rouverol | F16H 55/0806 74/457 |
| 4,640,149 | A * | 2/1987 | Drago | F16H 55/0806 74/462 |
| 10,527,149 | B2 * | 1/2020 | Berlinger, Jr. | F16H 1/06 |
| 2010/0327684 | A1 * | 12/2010 | Grosskopf | F16H 55/0806 310/83 |
| 2013/0068057 | A1 | 3/2013 | Grosskopf | |
| 2015/0233460 | A1 * | 8/2015 | Brust | F16H 55/08 310/90 |
| 2019/0101058 | A1 * | 4/2019 | Hochstetler | F16H 37/0806 |
| 2019/0146526 | A1 * | 5/2019 | Hochstetler | G05D 13/30 |

FOREIGN PATENT DOCUMENTS

EP 2202395 A2 6/2010

OTHER PUBLICATIONS

European Search Report for EP Application No. 18248237.2 dated Apr. 12, 2019.

* cited by examiner

*Primary Examiner* — Terence Boes

(74) *Attorney, Agent, or Firm* — Carlson, Gaskey & Olds, P.C.

(57) ABSTRACT

A governor drive gear for use in an integrated drive generator has a gear body extending between a first end and a second end and having a disc extending radially outwardly. A boss extends from the disc toward the second end. There are outer gear teeth outwardly of an outer diameter of the disc. The outer gear teeth have a unique gear tooth profile with roll angles A, B, C, and D. An integrated drive generator and a method are also disclosed.

14 Claims, 3 Drawing Sheets

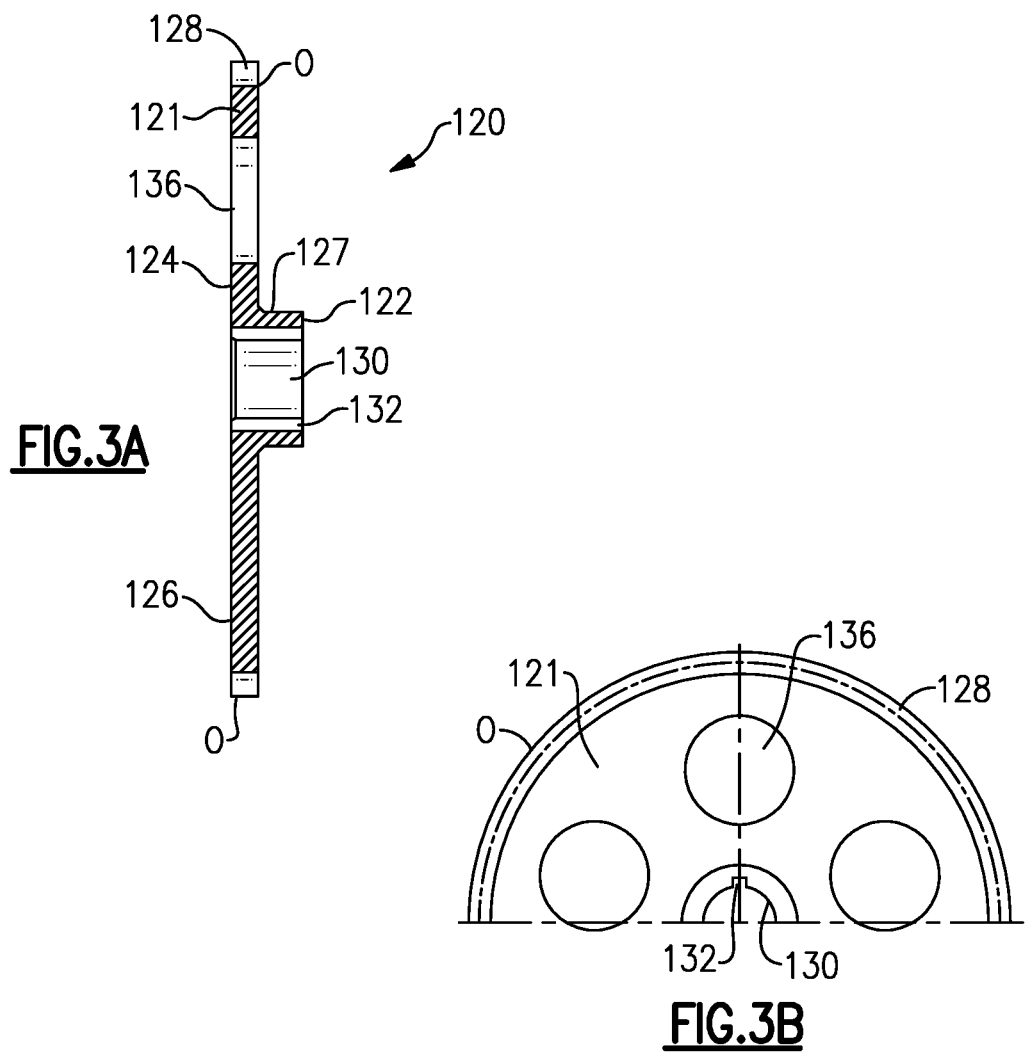
FIG.3A
FIG.3B
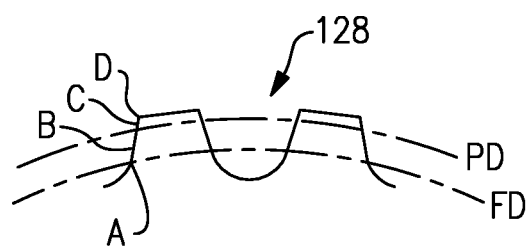
FIG.3C

GOVERNOR DRIVE GEAR FOR INTEGRATED DRIVE GENERATOR

BACKGROUND

This application relates to a governor drive gear for a governor in an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the output ring gear of the differential through an accessory drive gear. One such system is a governor driven by a governor drive gear.

The governor drive gear must successfully provide rotational input to a governor. There are challenges with regard to this drive gear.

SUMMARY

A governor drive gear for use in an integrated drive generator has a gear body extending between a first end and a second end and having a disc extending radially outwardly. A boss extends from the disc toward the second end. There are outer gear teeth outwardly of an outer diameter of the disc. The outer gear teeth have a unique gear tooth profile with roll angles A, B, C, and D. An integrated drive generator and a method are also disclosed.

In addition, an integrated drive generator is disclosed as is a method of replacing a governor drive gear in an integrated drive generator.

These and other features may be best understood from the following drawings and specification.

BRIEF DESCRIPTION OF THE DRAWINGS

FIG. 3A shows a governor drive gear.
FIG. 3B is a detail of the gear.
FIG. 3C shows a gear tooth profile.

DETAILED DESCRIPTION

Figure 1:
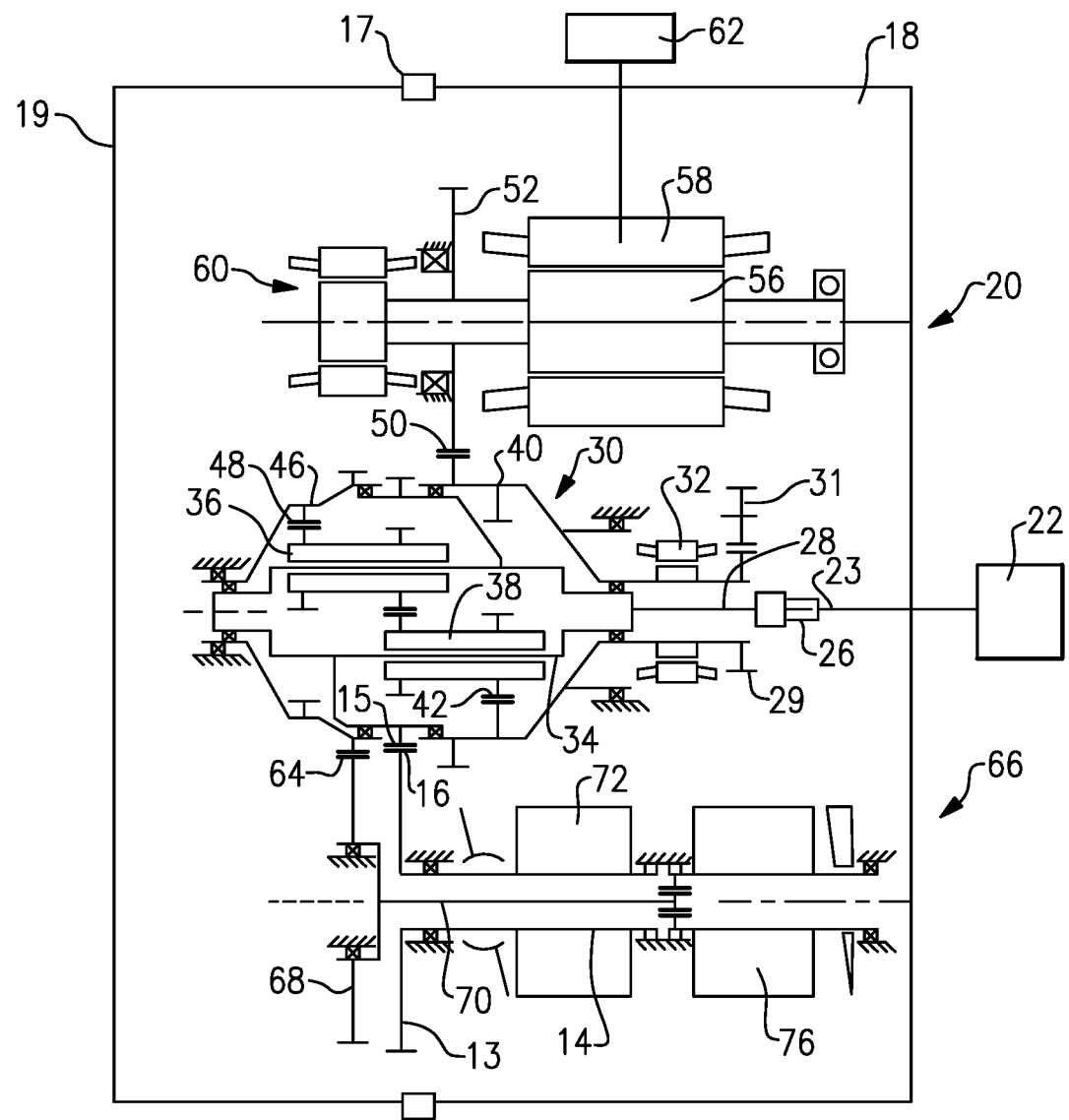
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and he speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. A governor drive gear 120, as disclosed below, is unique. A worker of ordinary skill would recognize that the desired frequency and speed at use 62 would dictate a number of design functions.

Figure 2:
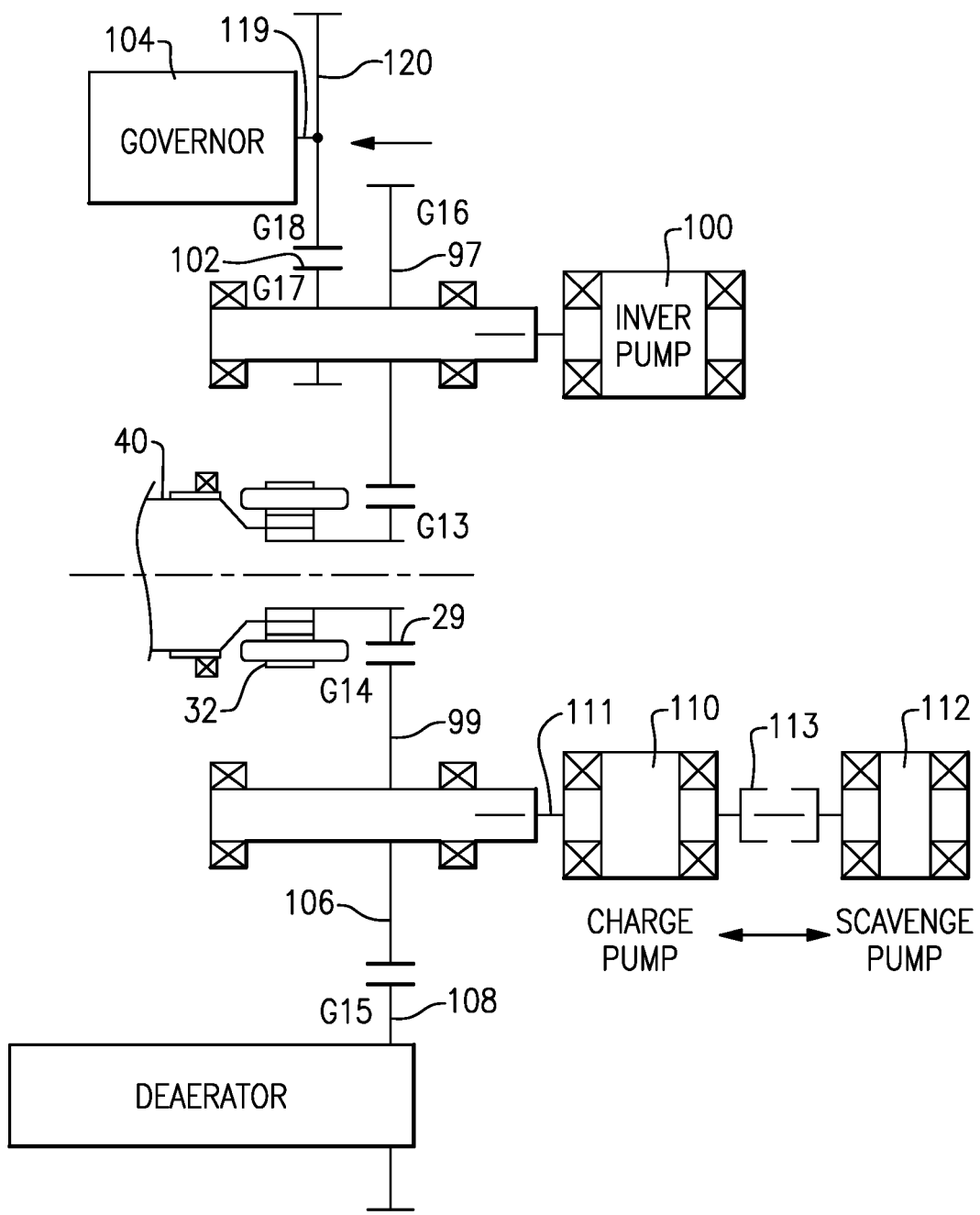
FIG. 2 shows an accessory gear drive train.

FIG. 2 shows the accessory drive gear 29. The accessory drive gear 29 drives a pair of gears 97 and 99. These gears were shown schematically as gear 31 in FIG. 1. One gear 97 drives a second intermediate gear 102, which, in turn, drives the governor 104 through a governor drive gear 120. The governor drive gear 120 is connected to a shaft 119 to drive governor 104. The gear 97 also drives an inversion pump 100.

The second gear 99 drives a deaerator through gear 108, as well as a charge pump 110 and a scavenge pump 112. For purposes of this application, this gear 99 will be called a scavenge/charge drive gear.

A shaft 111 is shown schematically connecting drive gear 99 to pump 110, and a shaft 113 connecting pump 110 to pump 112. Shaft 111 is driven by spline teeth in the drive gear 99, as will be explained.

FIG. 3A shows the governor drive gear 120 having a body 121 extending from a first end 122 to a second end 124. An enlarged disc 126 extends outwardly of a boss 127 extending between the disc 126 and the first end 122. Disc 126 has outer drive gear teeth 128 at an outer diameter O. Teeth 128 are driven by second intermediate gear 102. The boss 127 has an inner bore 130 to connect to a shaft. A bore 130 extends from the disc 126 toward the first end 122. A plurality of holes 136 are formed through disc 126.

FIG. 3B shows keyways 132 to facilitate securing body 121 to shaft 119.

FIG. 3C shows a profile of gear teeth 128. The gear teeth have a pitch diameter PD. In one embodiment, the pitch diameter is 3.00 inches (7.62 centimeters). This and all dimensions have a tolerance of +/− the 0.01 inch (0.025 centimeters).

A maximum form diameter FD is 2.91 inches (7.39 centimeters).

As known in the gear tooth art, the profile of the gear teeth is defined by roll angles at points A, B, C, and D. It should be understood specific roll angles of this disclosed gear are novel. All that is known in the art is the specific location of the points A-D.

In a disclosed embodiment, the roll angle at A was 21.6 degrees and in embodiments between 20.9 and 22.4 degrees. The roll angle at B was 23.5 degrees and in embodiments between 22.8 and 24.3 degrees. The roll angle at C was 29.1 degrees and in embodiments between 28.4 and 29.9 degrees. The roll angle at D was 30.9 degrees and in embodiments between 30.2 and 31.7 degrees.

The roll angle at A may be applied at the form diameter FD. The roll angle at B is 20 percent away from roll angle A and between roll angle A and roll angle D. The roll angle at C is 80 percent away from roll angle A and between roll angle A and roll angle D. The roll angle at D is at the outer diameter of the gear tooth.

In embodiments, there are 60 gear teeth 128.

A method of replacing a governor drive gear includes removing an existing governor drive gear from an integrated drive generator. The integrated drive generator has an input shaft and a gear differential including a carrier shaft. The gear differential includes a ring gear connected to a generator and an accessory drive gear. The accessory drive gear is connected to an intermediate gear, which is connected to the existing governor drive gear. The method also includes the step of replacing the existing governor drive gear with a replacement governor drive gear. The replacement scavenge/charge drive gear includes a gear body extending between a first end and a second end and having a disc extending radially outwardly. A boss extends from the disc toward the second end. Outer gear teeth are formed outwardly of an outer diameter of the disc. The outer gear teeth have a gear tooth profile with roll angles A, B, C, and D, and the roll angle at A being between 20.9 and 22.4 degrees, the roll angle at B being between 22.8 and 24.3 degrees, the roll angle at C being between 28.4 and 29.9 degrees, and the roll angle at D being between 30.2 and 31.7 degrees.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A governor drive gear for use in an integrated drive generator comprising:

a gear body extending between a first end and a second end and having a disc extending radially outwardly, and a boss extending from said disc toward said second end, there being outer gear teeth outwardly of an outer diameter of said disc, said outer gear teeth having a gear tooth profile with roll angles A, B, C, and D, and the roll angle at A for said outer gear teeth being between 20.9 and 22.4 degrees, the roll angle at B for said outer gear teeth being between 22.8 and 24.3 degrees, the roll angle at C for said outer gear teeth being between 28.4 and 29.9 degrees, and the roll angle at D for said outer gear teeth being between 30.2 and 31.7 degrees;

wherein said outer gear teeth have a pitch diameter of 3.00 inches (7.62 centimeters) with a tolerance of +/−0.01 inch (0.025 centimeters);

wherein there are 60 of said outer gear teeth; and wherein said outer gear teeth have a maximum form diameter of 2.91 inches (7.39 centimeters) with a tolerance of +/−0.01 inch (0.025 centimeters).

2. An integrated drive generator comprising:

an input shaft, a gear differential including a carrier shaft connected said input shaft and including a ring gear connected to a generator;

said ring gear also connected to an accessory drive gear, said accessory drive gear connected to an intermediate gear, connected to a governor drive gear;

said governor drive gear comprising a gear body extending between a first end and a second end and having a disc extending radially outwardly, and a boss extending from said disc toward said second end, there being outer gear teeth outwardly of an outer diameter of said disc, said outer gear teeth having a gear tooth profile with roll angles A, B, C, and D, and the roll angle at A for said outer gear teeth being between 20.9 and 22.4 degrees, the roll angle at B for said outer gear teeth being between 22.8 and 24.3 degrees, the roll angle at C for said outer gear teeth being between 28.4 and 29.9 degrees; the roll angle at D for said outer gear teeth being between 30.2 and 31.7 degrees; and said outer gear teeth engaged to said intermediate gear and said governor drive gear connected to a governor.

3. The integrated drive generator as set forth in claim 2 wherein said outer gear teeth have a pitch diameter of 3.00 inches (7.62 centimeters) with a tolerance of +/−0.01 inch (0.025 centimeters).

4. The integrated drive generator as set forth in claim 3, wherein there are 60 of said outer gear teeth.

5. The integrated drive generator as set forth in claim 4, wherein said outer gear teeth have a maximum form diameter of 2.91 inches (7.39 centimeters) with a tolerance of +/−0.01 inch (0.025 centimeters).

6. The integrated drive generator as set forth in claim 2, wherein said outer gear teeth have a maximum form diameter of 2.91 inches (7.39 centimeters) with a tolerance of +/−0.01 inch (0.025 centimeters).

7. The integrated drive generator as set forth in claim 6, wherein there are 60 of said outer gear teeth.

8. The integrated drive generator as set forth in claim 2, wherein there are 60 of said outer gear teeth.

9. A method of replacing a governor drive gear comprising the steps of:
   a) removing an existing governor drive gear from an integrated drive generator having an input shaft, a gear differential including a carrier shaft and the gear differential including a ring gear connected to a generator, said ring gear also connected for driving an accessory drive gear, said accessory drive gear being connected to an intermediate gear, which is connected to said existing governor drive gear; and
   b) replacing the existing governor drive gear with a replacement governor drive gear including a gear body extending between a first end and a second end and having a disc extending radially outwardly, and a boss extending from said disc toward said second end, there being outer gear teeth outwardly of an outer diameter of said disc, said outer gear teeth having a gear tooth profile with roll angles A, B, C, and D, and the roll angle at A for said outer gear teeth being between 20.9 and 22.4 degrees, the roll angle at B for said outer gear teeth being between 22.8 and 24.3 degrees, the roll angle at C for said outer gear teeth being between 28.4 and 39.9 degrees, and the roll angle at D for said outer gear teeth being between 30.2 and 31.7 degrees.

10. The method of replacing a governor drive gear as set forth in claim 9, wherein said outer gear teeth have a pitch diameter of 3.00 inches (7.62 centimeters) with a tolerance of +/−0.01 inch (0.025 centimeters).

11. The method of replacing a governor drive gear as set forth in claim 10, wherein there are 60 of said outer gear teeth.

12. The method of replacing a governor drive gear as set forth in claim 11, wherein said outer gear teeth have a maximum form diameter of 2.91 inches (7.39 centimeters) with a tolerance of +/−0.01 inch (0.025 centimeters).

13. The method of replacing a governor drive gear as set forth in claim 9, wherein said outer gear teeth have a maximum form diameter of 2.91 inches (7.39 centimeters) with a tolerance of +/−0.01 inch (0.025 centimeters).

14. The method of replacing a governor drive gear as set forth in claim 9, wherein there are 60 of said outer gear teeth.

\* \* \* \* \*